(12) United States Patent
Mongillo, Jr. et al.

(10) Patent No.: US 10,655,496 B2
(45) Date of Patent: May 19, 2020

(54) PLATFORM FLOW TURNING ELEMENTS FOR GAS TURBINE ENGINE COMPONENTS

(71) Applicant: United Technologies Corporation, Farmington, CT (US)

(72) Inventors: Dominic J. Mongillo, Jr., West Hartford, CT (US); Adam P. Generale, Dobbs Ferry, NY (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 101 days.

(21) Appl. No.: 15/852,198

(22) Filed: Dec. 22, 2017

(65) Prior Publication Data
US 2019/0195086 A1    Jun. 27, 2019

(51) Int. Cl.
*F01D 25/12*     (2006.01)
*F01D 5/18*      (2006.01)
(Continued)

(52) U.S. Cl.
CPC ............. *F01D 25/12* (2013.01); *F01D 5/141* (2013.01); *F01D 5/147* (2013.01); *F01D 5/18* (2013.01); *F01D 5/187* (2013.01); *F01D 5/188* (2013.01); *F01D 9/02* (2013.01); *F01D 9/042* (2013.01); *F05D 2220/32* (2013.01); *F05D 2240/80* (2013.01); *F05D 2240/81* (2013.01); *F05D 2260/20* (2013.01); *F05D 2260/201* (2013.01)

(58) Field of Classification Search
CPC . F01D 25/12; F01D 9/02; F01D 5/188; F01D 5/189; F01D 9/065
See application file for complete search history.

(56) References Cited

U.S. PATENT DOCUMENTS

| 6,589,010 B2 | 7/2003 | Itzel et al. |
| 8,864,438 B1 | 10/2014 | Lee et al. |

(Continued)

FOREIGN PATENT DOCUMENTS

| EP | 1284338 A2 | 2/2003 |
| EP | 2107214 A1 | 10/2009 |

(Continued)

OTHER PUBLICATIONS

European Search Report for European Application No. 18201670.9, International Filing Date Oct. 22, 2018, dated May 21, 2019, 7 pages.

*Primary Examiner* — Woody A Lee, Jr.
*Assistant Examiner* — Michael L Sehn
(74) *Attorney, Agent, or Firm* — Cantor Colburn LLP

(57) ABSTRACT

Component for gas turbine engines are provided. The components include a platform, the platform defining a platform cavity on a first side, an airfoil extending from a second side of the platform, wherein the airfoil comprises at least one airfoil cavity located within the airfoil, the at least one airfoil cavity fluidly connected to the platform cavity through an airfoil cavity inlet, and a platform flow turning element positioned on the first side of the platform, the platform flow turning element having a turning portion and a tapering portion, wherein the turning portion directs incoming air to turn from the platform cavity into the airfoil cavity and the tapering portion extends through the airfoil cavity inlet and into the airfoil cavity.

13 Claims, 6 Drawing Sheets

(51) Int. Cl.
*F01D 9/04* (2006.01)
*F01D 5/14* (2006.01)
*F01D 9/02* (2006.01)

(56) References Cited

U.S. PATENT DOCUMENTS

2016/0326890 A1* 11/2016 Hagan ..................... F01D 5/189
2017/0130604 A1 5/2017 Hernandez et al.

FOREIGN PATENT DOCUMENTS

| EP | 2626519 A1 | | 8/2013 | |
|----|------------|---|--------|---|
| GB | 1322801 A | | 7/1973 | |
| GB | 1322802 A | * | 7/1973 | ............ F01D 5/189 |

* cited by examiner

PLATFORM FLOW TURNING ELEMENTS FOR GAS TURBINE ENGINE COMPONENTS

STATEMENT REGARDING FEDERALLY SPONSORED RESEARCH OR DEVELOPMENT

This invention was made with government support under Contract No. FA8626-16-C-2139 awarded by the U.S. Air Force. The government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, components for gas turbine engines are provided. The components include a platform, the platform defining a platform cavity on a first side, an airfoil extending from a second side of the platform, wherein the airfoil comprises at least one airfoil cavity located within the airfoil, the at least one airfoil cavity fluidly connected to the platform cavity through an airfoil cavity inlet, and a platform flow turning element positioned on the first side of the platform, the platform flow turning element having a turning portion and a tapering portion, wherein the turning portion directs incoming air to turn from the platform cavity into the airfoil cavity and the tapering portion extends through the airfoil cavity inlet and into the airfoil cavity.

In addition to one or more of the features described herein, or as an alternative, further embodiments of the components may include that the platform flow turning element is welded to the first side of the platform.

In addition to one or more of the features described herein, or as an alternative, further embodiments of the components may include a cover plate mounted to the platform, wherein the cover plate and the first side of the platform define bounds of the platform cavity.

In addition to one or more of the features described herein, or as an alternative, further embodiments of the components may include that the cover plate comprises at least one impingement opening to enable airflow to enter the platform cavity.

In addition to one or more of the features described herein, or as an alternative, further embodiments of the components may include that the airfoil includes a plurality of airfoil cavities, each airfoil cavity having a respective airfoil cavity inlet, the component further comprising an additional platform flow turning element positioned on the first side of the platform and arranged relative to and within one additional airfoil cavity of the plurality of airfoil cavities.

In addition to one or more of the features described herein, or as an alternative, further embodiments of the components may include that the platform flow turning element extends a first distance above the first side of the platform and the turning portion of the platform flow turning element extends a second distance from the second side of the platform and into the airfoil cavity.

In addition to one or more of the features described herein, or as an alternative, further embodiments of the components may include that the tapering portion defines a first turning inlet and a second turning inlet, wherein the first and second turning inlets are open to the platform cavity.

In addition to one or more of the features described herein, or as an alternative, further embodiments of the components may include that the platform flow turning element is made from sheet metal.

In addition to one or more of the features described herein, or as an alternative, further embodiments of the components may include that the second side is exposed to a hot gaspath of a gas turbine engine.

In addition to one or more of the features described herein, or as an alternative, further embodiments of the components may include that the airfoil is a vane of a gas turbine engine.

According to some embodiments, gas turbine engines are provided. The gas turbine engines include a component including a platform, the platform defining a platform cavity on a first side, an airfoil extending from a second side of the platform, wherein the airfoil comprises at least one airfoil cavity located within the airfoil, the at least one airfoil cavity fluidly connected to the platform cavity through an airfoil cavity inlet, and a platform flow turning element on the first side of the platform, the platform flow turning element having a turning portion and a tapering portion, wherein the turning portion directs incoming air to turn from the platform cavity into the airfoil cavity and the tapering portion extends through the airfoil cavity inlet and into the airfoil cavity.

In addition to one or more of the features described herein, or as an alternative, further embodiments of the gas turbine engines may include that the platform flow turning element is welded to the first side of the platform.

In addition to one or more of the features described herein, or as an alternative, further embodiments of the gas turbine engines may include a cover plate mounted to the platform, wherein the cover plate and the first side of the platform define bounds of the platform cavity.

In addition to one or more of the features described herein, or as an alternative, further embodiments of the gas turbine engines may include that the cover plate comprises at least one impingement opening to enable airflow to enter the platform cavity.

In addition to one or more of the features described herein, or as an alternative, further embodiments of the gas turbine engines may include that the airfoil includes a plurality of airfoil cavities, each airfoil cavity having a respective airfoil cavity inlet, the component further comprising an additional platform flow turning element positioned on the first side of the platform and arranged relative to and within one additional airfoil cavity of the plurality of airfoil cavities.

In addition to one or more of the features described herein, or as an alternative, further embodiments of the gas turbine engines may include that the platform flow turning element extends a first distance above the first side of the platform and the turning portion of the platform flow turning element extends a second distance from the second side of the platform and into the airfoil cavity.

In addition to one or more of the features described herein, or as an alternative, further embodiments of the gas turbine engines may include that the tapering portion defines a first turning inlet and a second turning inlet, wherein the first and second turning inlets are open to the platform cavity.

In addition to one or more of the features described herein, or as an alternative, further embodiments of the gas turbine engines may include that the platform flow turning element is made from sheet metal.

In addition to one or more of the features described herein, or as an alternative, further embodiments of the gas turbine engines may include that the second side is exposed to a hot gaspath of the gas turbine engine.

In addition to one or more of the features described herein, or as an alternative, further embodiments of the gas turbine engines may include that the airfoil is a vane of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
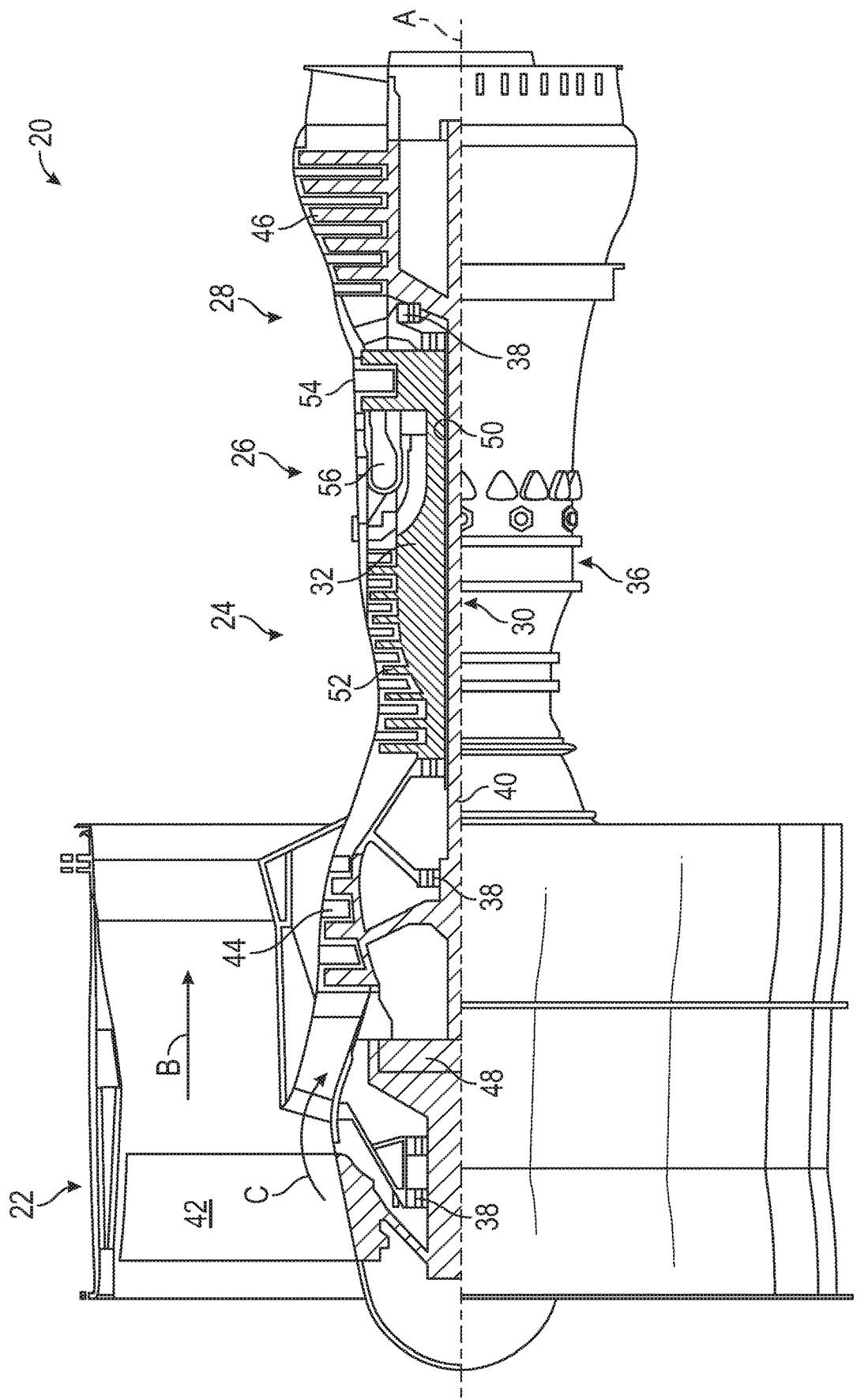
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
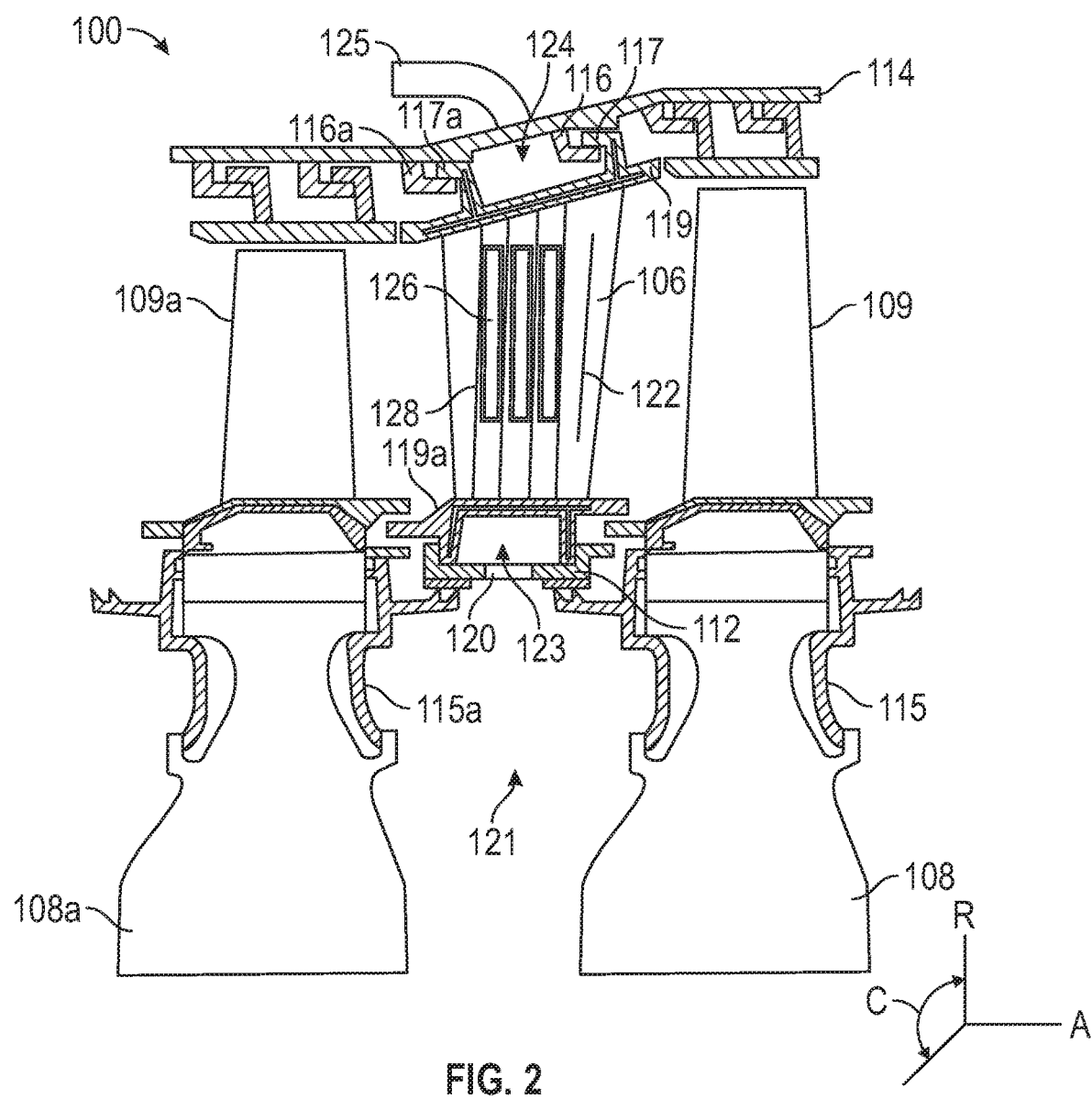
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

A turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119a can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

As noted above, in a conventional vane design, often the cooling air to be utilized on the platform is ejected into the main gas path through film cooling holes directly on the exterior gaspath surface of the inner diameter and/or outer diameter vane platform(s). However, embodiments provided herein are directed to utilizing the cooling air for cooling both the platforms and the main body of the airfoil. Such cooling air must flow from the platform area/cavity into the radially extending airfoil cavities, and thus will be required to have a minimum of a 90 degree turn to enter into the airfoil. Such turning of the cooling air flow can often result in flow separations and recirculation off of internal surface(s) of the airfoil hot exterior wall resulting in low or poor backside convective heat transfer characteristics which is necessary to provide an adequate local thermal cooling effectiveness needed to achieve required metal temperatures and part durability life objectives. In cooling design configurations where the same coolant flow is utilized to cool the inner diameter and/or the outer diameter platforms and the airfoil exterior hot walls, it may be necessary to provide convective cooling along platform surfaces that are immediately adjacent to both the airfoil pressure and suction side surfaces. In this scenario, platform cooling air flow may be "drawn" from various opposing and non-opposing directions in order to provide the necessary cooling airflow required to adequately cool the vane airfoil pressure side and suction side surfaces, as well as, the vane airfoil leading and trailing edge surfaces.

In order to produce necessary backside convective cooling and subsequent thermal cooling effectiveness levels required to achieve platform durability oxidation and thermal mechanical fatigue life it is desirable to maintain the mass flow rate and cooling air velocities at a relatively high level immediately adjacent to the platform surfaces on either side of the entrance to the inlet(s) of the vane airfoil. In order to maximize airfoil convective cooling requirements and achieve thermal performance, it becomes necessary to mitigate the adverse cooling flow characteristics that produce high inlet pressure losses, flow separation, and regions of recirculation. Acute turning of high velocity multi-directional opposing and non-opposing cooling flows that enter into the inlet of the vane airfoil must be tailored to ensure proper conditioning of the local flow field in order to maximize the local convective heat transfer. Accordingly, embodiments of the present disclosure are directed to platform flow turning elements that improve the quality and conditioning of the cooling air flow as it is turned into the entrance of the vane airfoil. The implementation of the platform flow turning devices described herein are designed to optimally maintain cohesive airflow structures that provide improved cooling flow injection from a platform region into the internal cooling cavities of an airfoil.

The platform flow turning elements defined herein provide two primary purposes. The first is to enable directional control of a cooling fluid (e.g., turning) and the second is to provide the functionality of a space-eater baffle design concept along a portion and/or along the entire inlet length of an airfoil (e.g., at an entrance into an airfoil cooling cavity). The platform flow turning elements are used to tailor the internal cooling flow and Mach number distribution for optimal heat extraction into the working fluid. Additionally, the design of the platform turning element features enable them to function similar to a space-eater baffle or other element (e.g. a portion of the platform flow turning elements) that occupies a portion of the volume of a cavity (e.g., an airfoil cavity) in order to reduce the physical cross-sectional flow area and/or volume of one or more of the airfoil cooling passages. The reduction in cross-sectional flow area achievable with a space-eater baffle concept enables the local flow per unit area and convective heat transfer to be significantly increased along the internal surface of the hot exterior airfoil wall. The platform flow turning elements facilitate the development of cohesive and continuous convective cooling characteristics by controlling and modifying the vortices of the cooling air flow as it is redirected from the platform (e.g., cooling air) through the inlets of the airfoil cooling passages. By placing the platform flow turning elements outboard of the platform, as shown and described herein, the platform flow turning elements can prevent the mixing of opposing jets from resulting in a loss of pressure while also assuring that the injected cooling flow adheres to the internal walls of the airfoil cavity.

Figure 3:
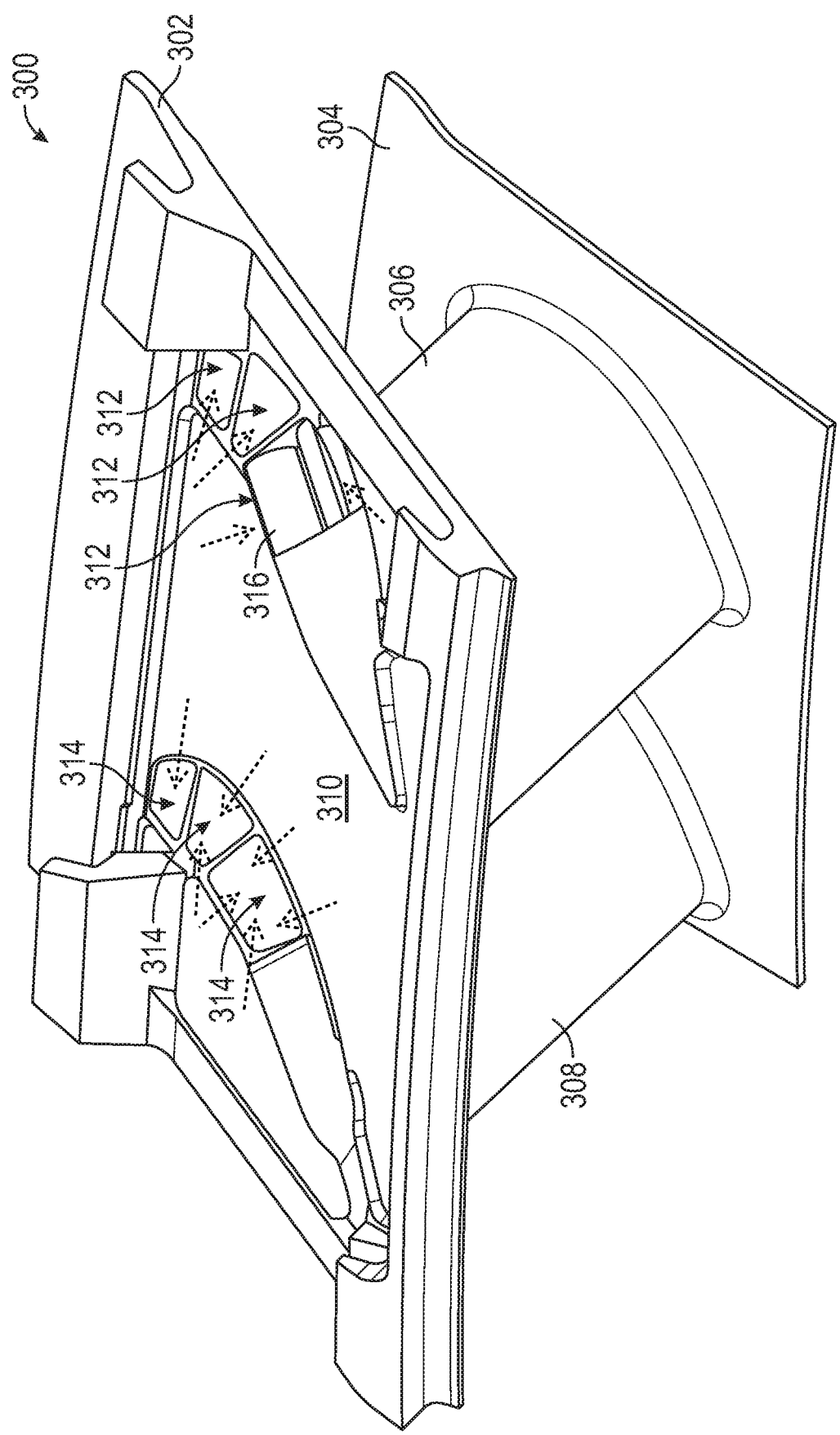
FIG. 3 is a schematic illustration of a component of a gas turbine engine in accordance with an embodiment of the present disclosure.

Turning to FIG. 3, a gas turbine engine component 300 is schematically shown. The gas turbine engine component 300 includes a first platform 302 and a second platform 304. Extending between the first and second platforms 302, 304 are a first airfoil 306 and a second airfoil 308. The gas turbine engine component 300, as shown, forms a portion of a vane section that can be installed in a turbine section of a gas turbine engine (e.g., as shown and describe above).

As shown in FIG. 3, the airfoils 306, 308 include a plurality of airfoil cavities, which are open to and in fluid communication with a platform space or platform cavity 310. In FIG. 3, the platform cavity 310 is formed between the illustrated surface of the first platform 302 and a cover plate (not shown). Those of skill in the art will appreciate that use of cover plates on platforms to form the platform cavities, and the cover plate is not shown for clarity and simplicity of illustration. Accordingly, as will be appreciated by those of skill in the art, a platform cavity is a cavity or volume that is formed between a surface of a platform on a side opposite a main, hot gaspath of the platform (i.e., a backside surface of the platform) and a cover plate that is installed to the platform. The platform cavity in operation will act as a cooling air channel that is formed between the cover plate and the backside of the platform surface which creates a conduit for cooling air to be transferred across the cold side of platform surfaces to provide convective cooling. The cooling air within the platform cavity is also fed into inlets of a vane airfoil to provide cooling within the vanes. Such inlets can be provided at both inner and outer diameter platforms of the airfoil (e.g., first and second platforms 302, 304) and thus cooling air can be provided from two or more opposing platform cavities. Those of skill in the art will appreciate that the cover plates can include a single inlet feed for cooling air or may include multiple impingement holes (e.g., an array).

For example, as shown, the first airfoil 306 includes respective airfoil cavity inlets 312 and the second airfoil 308 includes respective airfoil cavity inlets 314. The airfoil cavity inlets 312, 314 are inlets to internal airfoil cavities that, in some arrangements, extend from the first platform 302, through the respective airfoil 306, 308, and to the second platform 304, thus providing a cooling flow path through the respective airfoil 306, 308. In some arrangements, the airfoils 306, 308 are integrally formed with the platforms 302, 304 and in other arrangements, the airfoils 306, 308 can be separately formed and subsequently attached to the platforms 302, 304. Air within the platform cavity 310 (between the first platform 302 and a cover plate) can be fed into the airfoil cavity inlets 312, 314. In typical airfoil/platform arrangements, the cooling air within the platform cavity 310 will enter the airfoil cavity inlets 312, 314 from any/all directions, thus causing cooling flow efficiency issues as described above. In some airfoil/platform arrangements, multiple platform sub-cavities can be formed between adjacent airfoils (e.g., between first and second airfoil 306, 308) along the backside of the platform 302. In some such arrangements, the cooling air from two platform sub-cavities will flow toward each other at the airfoil cavity inlets 312, 314, and thus mix and interact and potentially cause cooling flow inefficiencies, which is undesirable (e.g., turbulent mixing which can induce significant pressure loss and flow separation). A schematic illustration of airflow from the platform cavity 310 flowing toward the airfoil cavity inlets 312, 314 in opposing directions is shown by the dashed arrows of FIG. 3

Accordingly, as shown in FIG. 3, the first airfoil 306 is configured with a platform flow turning element 316 positioned in one of the inlets 312 of the first airfoil 306. The platform flow turning element 316 is arranged to funnel and direct air from the two opposing platform cavities (i.e., platform cavity 310 shown at the first platform 302, and a second platform cavity being present below the second platform 304) into the airfoil cavity 312 to reduce losses of pressure from the air mixing with the flow from the opposite side of the airfoil entering in from the platform. Although shown with a single platform flow turning element 316 in a single inlet 312, those of skill in the art will appreciate that each inlet 312, 314 of the airfoils 306, 308 can include a platform flow turning element 316 installed therein.

Figure 4:
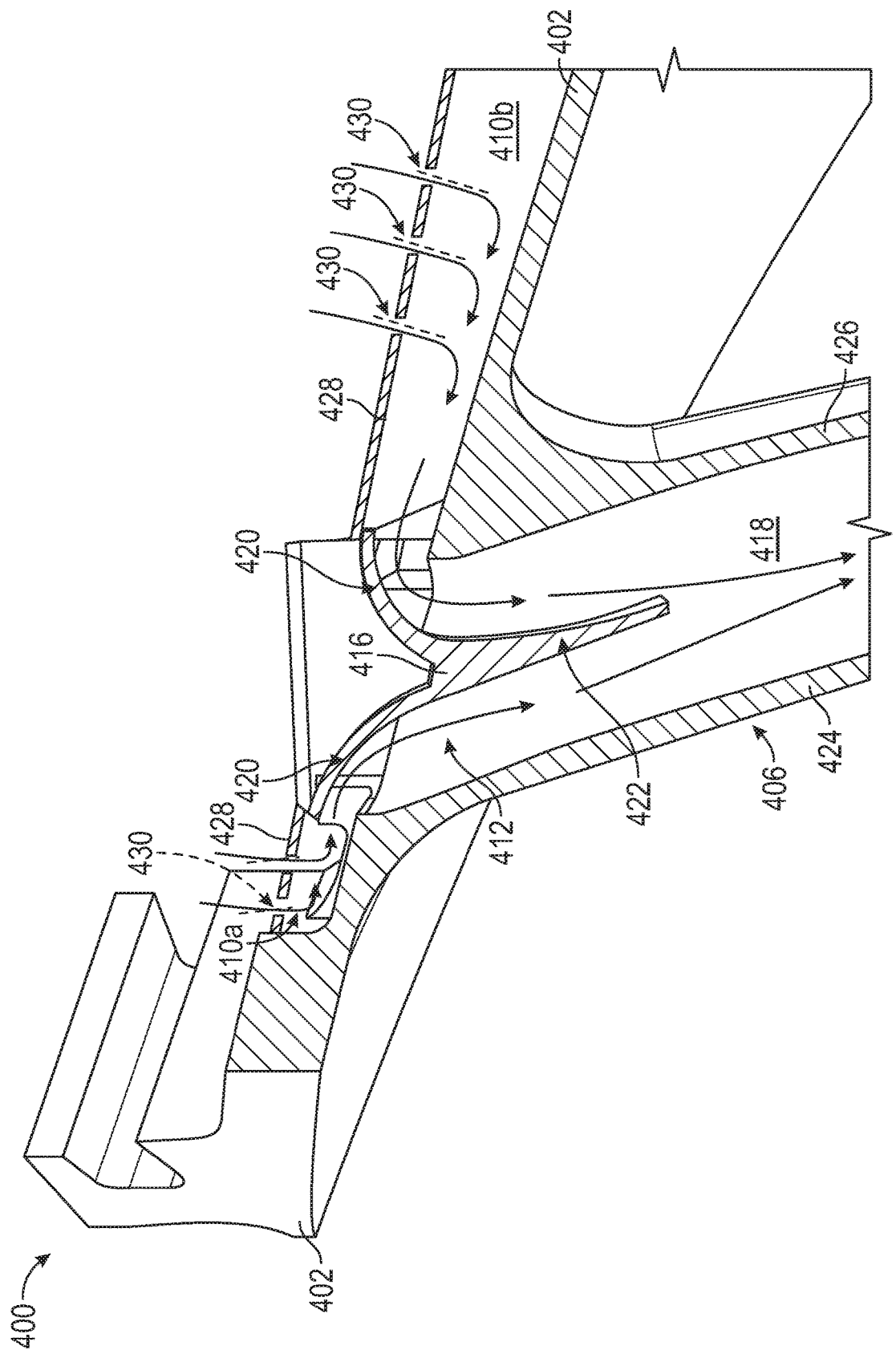
FIG. 4 is a side elevation view of a component of a gas turbine engine in accordance with an embodiment of the present disclosure.

Turning now to FIG. 4, a side view illustration of a gas turbine engine component 400 having a platform flow turning element 416 installed thereto is shown. FIG. 4 also illustrates a flow direction of cooling air flowing from adjacent (and opposing) platform sub-cavities 410a, 410b into an airfoil cavity 418 of an airfoil 406. As shown, the airfoil 406 is integrally formed with a platform 402. The platform 402 and a cover plate 428 define the platform sub-cavities 410a, 410b. As illustratively shown, airflow within the opposing platform sub-cavities 410a, 410b flow toward each other and then into the airfoil cavity 418. The airfoil cavity 418 is fluidly connected to the platform sub-cavities 410a, 410b through an inlet 412, similar to that shown and described above.

The platform flow turning element 416 is installed within the inlet 412 of the airfoil 406 and is arranged to direct air flowing from the opposing platform sub-cavities 410a, 410b into the airfoil cavity 418, to thus prevent turbulent mixing of the air from each of the platform sub-cavities 410a, 410b as the air enters the inlet 412. As shown, the platform flow turning element 416 includes a turning portion 420 and a tapering portion 422. The turning portion 420 extends into the platform sub-cavities 410a, 410b and is arranged to funnel or direct (and turn) air flow flowing from the platform sub-cavities 410a, 410b into the airfoil cavity 418. The tapering portion 422 extends into the airfoil cavity 418 and is arranged to direct the inflowing air from the turning portion 420 such that the air will be flowing all in the same direction and thus turbulent interaction will be reduced, minimized, or eliminated. Further, the tapering portion 422 will separate flows along a pressure side 424 and a suction side 426 of the airfoil 406.

In the embodiment of FIG. 4, the cover plate 428, is optional and can be installed on the platform 402. The platform cover plate 428 can include one or more impingement opening 430 (e.g., a hole, aperture, slot, etc.) that enable a cooling flow to enter the platform sub-cavities 410a, 410b. In such embodiments, cooling flow enters the platform sub-cavities 410a, 410b through the impingement openings 430 and travels along a surface of the platform 402 to the airfoil cavity 418. Although shown in FIG. 4 with the use of an arrangement of impingement openings 430 formed in the cover plate 428, those of skill in the art will appreciate that other arrangements (e.g., single feed port) can be used without departing from the scope of the present disclosure. The turning portions 420 of the platform flow turning element 416 prevents opposing jets or flows of air from entering the airfoil cavity 418 and interacting and/or interfering with each other. That is, the platform flow turning element 416 redirects flow into the airfoil cavity 418 in an efficient manner that reduces, minimized, or eliminates losses as the air turns and enters the airfoil cavity 418.

Although shown with a specific arrangement, the platform flow turning elements of the present disclosure can take various shapes or configurations to achieve a desired turning and injection of air from a platform cavity into an airfoil cavity. For example, a turning radius or shape of the turning portion can be designed to achieve a specific turning to reduce the impact of the orthogonal orientation of the predominantly circumferentially aligned platform cavities relative to the predominantly radially oriented airfoil cooling cavities. Further, the length and shape of the tapering portion can be arranged to achieve both flow orientation (e.g., parallel flow from both sides of the taping portion) and to provide a space-eating structure within the airfoil cavity. For example, the width (i.e., the dimension between the pressure side 424 and the suction side 426 shown in FIG. 4) of the space-eater portion of the platform flow turning elements can be tailored to achieve a desired Mach number with a set mass flow rate.

Figure 5:
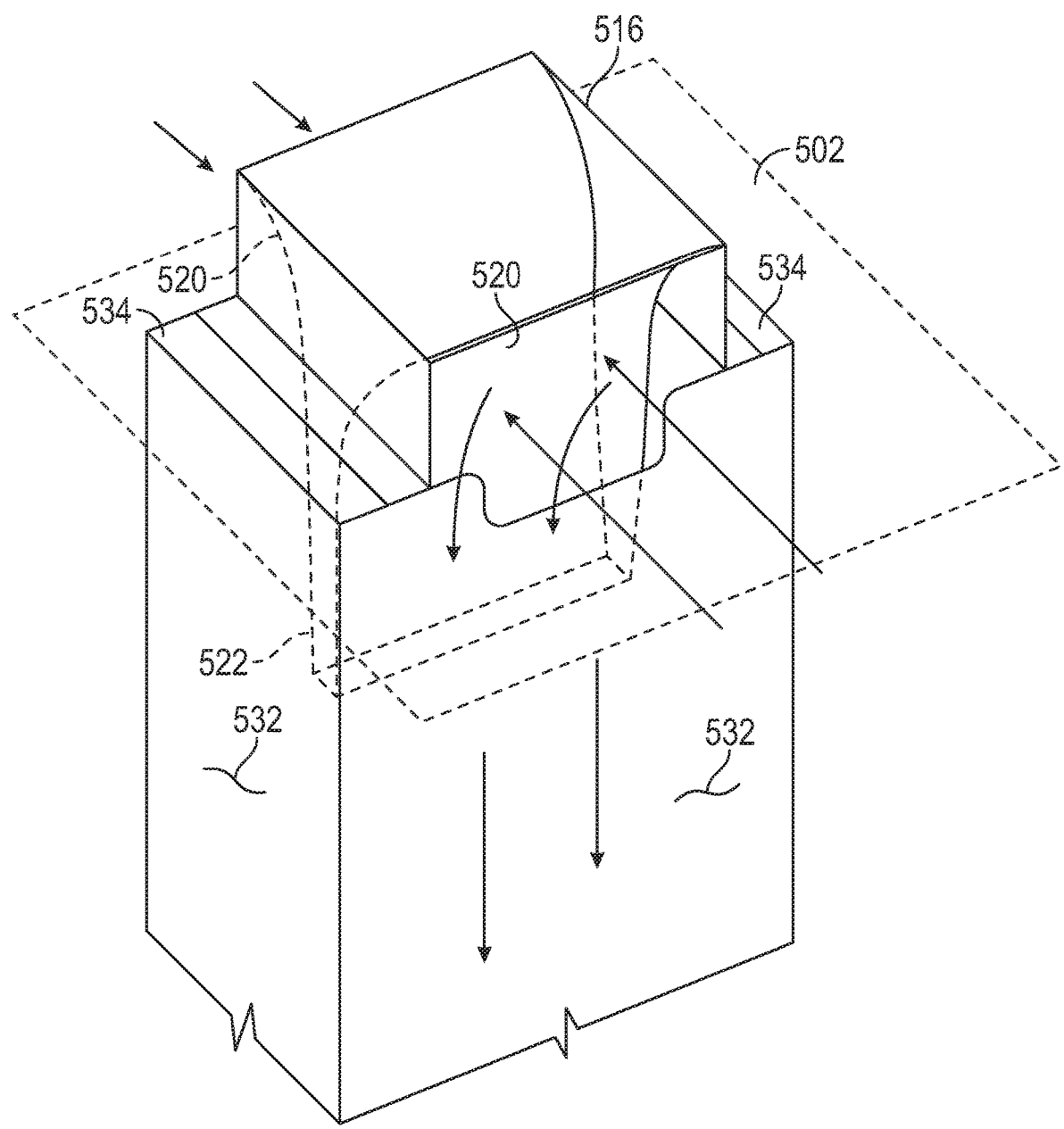
FIG. 5 is an isometric illustration of a component of a gas turbine engine in accordance with an embodiment of the present disclosure.

Additionally, it is to be understood that the surfaces comprising the platform flow turning element may exhibit curvature in a multitude of directions other than just a streamwise direction, and thus the illustrations provided herein are merely provided for example and are not to be limiting. The shape of each of the turning surfaces in the predominately axial direction may be designed to mirror the shape and curvature of the inlet cavity profile of the predominately radially and orthogonally oriented cooling cavity passage and/or passages. Likewise, the surface curvature of the platform flow turning element may be uniquely and independently defined in order to optimally manage the cooling air flow discharged from each of the individual opposing platform cavities (e.g., inner diameter and outer diameter platform cavities). Moreover, the length of extension of the platform flow turning elements into the respective airfoil cavities may be optimized to achieve a desired space-eater function necessary to ensure the proper flow velocity and favorable heat transfer characteristics are achieved. Similarly, the length of the space-eater extension may also be varied to ensure adequate air flow development length and alignment of the at least two independent cooling air flow stream sources before the flows are merged in order to minimize and/or mitigate any adverse momentum mixing and pressure losses that may occur once the two flow streams are combined Turning now to FIG. 5, a partial isometric illustration of a platform flow turning element 516 mounted relative to an airfoil cavity is shown. The airfoil cavity is bounded by airfoil cavity walls 532. As shown, the platform flow turning element 516 includes turning portions 520 and a tapering portion 522, with the tapering portion 522 extending into the airfoil cavity. The turning portions 520 extend above a platform 502 and the tapering portion 522 extends below the platform 502. A cooling flow will enter the platform flow turning element 516 from two sides and at the turning portions 520 and then be turned and directed inward into the airfoil cavity, as illustratively shown.

In this embodiment, the platform flow turning element 516 is a separate structure that is fixedly attached to the platform 502. For example, as shown, the platform flow turning element 516 includes attachment portions 534 which can be fixed to the platform 502. As such, the platform flow turning element 516 can be attached to the platform 502 and inserted into the airfoil cavity of existing configurations (i.e., retrofit applications to existing platforms/airfoils).

In some such embodiments, the platform flow turning elements of the present disclosure can be manufactured from sheet metal. The sheet metal can be cut into a preform shape that is subsequently folded in order to provide a combination of a turning vane (turning portions) along with a space eater (tapering portion) at the entrance from the platform to the airfoil. Likewise, the platform flow turning element may be fabricated using alternative casting and additive manufacturing processes and can be formed directly using metal powder base fusion additive manufacturing processes. Additionally, the platform turning flow element may be created using additive manufacturing processes fabricated using ceramic alumina or silica core material from which conventional lost wax investment casting processes may be used to integrally form the platform cooling channels and the flow turning elements. Accordingly, those of skill in the art will appreciate that various fabrication and/or manufacturing techniques and processes can be employed to manufacture embodiments described herein. For example, the use of alternative manufacturing processes can be employed, including, but not limited to, fugitive core technology and/or additive technology to fabricate the platform flow turning elements. Utilization of these technologies enables separate fabrication of the platform flow turning elements or may enable the platform flow turning elements to be an integral component of the design configuration, which may not require a separate assembly and manufacturing operation to secure the platform flow turning elements to the platform.

Figure 6:
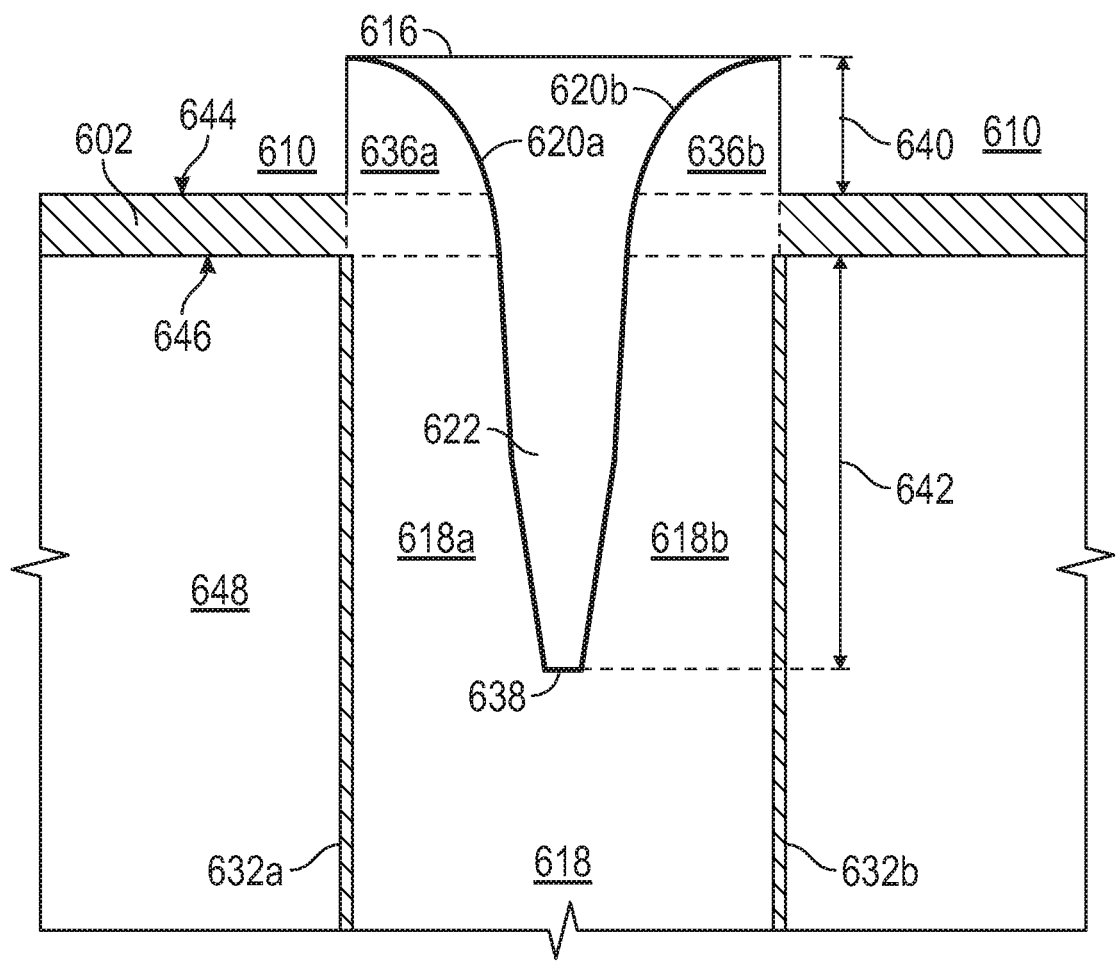
FIG. 6 is a side schematic illustration of a component of a gas turbine engine in accordance with an embodiment of the present disclosure.

Turning now to FIG. 6, a side view illustration of a platform flow turning element 616 mounted on a platform 602 relative to an airfoil cavity 618 is shown. The airfoil cavity 618 is bounded by airfoil cavity walls 632a, 632b. In some arrangements a first airfoil cavity wall 632a may be a pressure side wall of an airfoil and a second airfoil cavity wall 632b may be a suction side wall of the airfoil. As shown, the platform flow turning element 616 includes a first turning portion 620a and a second turning portion 620b. The turning portions 620a, 620b include or define turning inlets 636a, 636b that are fluidly connected or open to a platform cavity 610. Air within the platform cavity 610 will enter the turning inlets 636a, 636b and turn toward the airfoil cavity 618. The air will flow along the turning portions 620a, 620b and turn into a generally parallel or similar direction into the airfoil cavity 618. The air will continue flowing along a tapering portion 622 that extends into the airfoil cavity 618. The tapering portion 622 divides the airfoil cavity 618 into a cavity first inlet 618a and a cavity second inlet 618b. As the flow moves through the cavity first inlet 618a and the cavity second inlet 618b, the tapering portion 622 reduces in size/dimension such that the flows within the cavity first inlet 618a and the cavity second inlet 618b will expand and can subsequently merge downstream of an end 638 of the platform flow turning element 616, with the merged flow flowing within the airfoil cavity 618.

As shown, the platform flow turning element 616 includes a section that extends above the platform 602 (away from the airfoil cavity 618) and a section that extends below the platform 602 (into the airfoil cavity 618). The turning portions 620a, 620b extend above a platform 602 a first distance 640 and the tapering portion 622 extends below the platform 602 a second distance 642 to the end 638 of the platform flow turning element 616. The first distance 640 is selected to enable a desired amount of cooling flow to enter the airfoil cavity 618 from the platform cavity 610. The second distance 642 is selected to enable the tapering portion 622 to provide a space eating feature within the airfoil cavity 618 and to maintain separation of the flows entering through the turning inlets 636a, 636b until the flows merge downstream of the end 638.

As shown in FIG. 6, the platform 602 has a first side 644 that defines, in part, the platform cavity 610. Further, the platform 602 has a second side 646 opposite the first side 644, and when installed in a gas turbine engine, the second side 646 may be exposed to a hot gaspath 648, as will be appreciated by those of skill in the art. The platform flow turning element 616 is positioned on the first side 644 of the platform 602 and extending the first distance 640 therefrom. The tapering portion 622 of the platform flow turning element 616 extends into the airfoil cavity 618 the second distance 642, which is measured from the second side 646 of the platform 602.

Advantageously, embodiments provided herein are directed to platform flow turning elements that enable improved cooling flow from a platform into internal cavities of an airfoil. As such, advantageously, platform cooling air can be reused in an effort to cool an airfoil body, without necessarily requiring additional cooling air and/or application of pressure to such air.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, the component comprising:
   a platform, the platform defining a platform cavity on a first side;
   an airfoil extending from a second side of the platform, wherein the airfoil comprises at least one airfoil cavity located within the airfoil, the at least one airfoil cavity fluidly connected to the platform cavity through an airfoil cavity inlet;
   a platform flow turning element positioned on the first side of the platform, the platform flow turning element having a turning portion and a tapering portion, wherein the turning portion directs incoming air to turn from the platform cavity into the airfoil cavity and the tapering portion extends through the airfoil cavity inlet and into the airfoil cavity; and a cover plate mounted to the platform, wherein the cover plate and the first side of the platform define bounds of the platform cavity, wherein the cover plate comprises at least one impingement opening to enable airflow to enter the platform cavity, wherein the tapering portion defines a first turning inlet and a second turning inlet, wherein the first and second turning inlets are open to the platform cavity, wherein the first turning inlet faces a first direction to receive a flow of air from the platform cavity flowing in a first flow direction and second turning inlet faces a second direction, opposite the first direction, to receive a flow of air from the platform cavity flowing in a second flow direction, opposite the first flow direction, such that the platform flow turning element receives flow from two opposite direction, and wherein the platform flow turning element is configured to turn a flow of air flowing in the first flow direction and a flow of air flowing in the second flow direction along the tapering portion such that the two flows of air flow in the same flow direction within the airfoil cavity.

2. The component of claim 1, wherein the platform flow turning element is welded to the first side of the platform.

3. The component of claim 1, wherein the platform flow turning element extends a first distance above the first side of the platform and the turning portion of the platform flow turning element extends a second distance from the second side of the platform and into the airfoil cavity.

4. The component of claim 1, wherein the platform flow turning element is made from sheet metal.

5. The component of claim 1, wherein the second side is exposed to a hot gaspath of a gas turbine engine.

6. The component of claim 1, wherein the airfoil is a vane of a gas turbine engine.

7. A gas turbine engine comprising:
a component comprising:
a platform, the platform defining a platform cavity on a first side;
an airfoil extending from a second side of the platform, wherein the airfoil comprises at least one airfoil cavity located within the airfoil, the at least one airfoil cavity fluidly connected to the platform cavity through an airfoil cavity inlet;
a platform flow turning element positioned on the first side of the platform, the platform flow turning element having a turning portion and a tapering portion, wherein the turning portion directs incoming air to turn from the platform cavity into the airfoil cavity and the tapering portion extends through the airfoil cavity inlet and into the airfoil cavity; and a cover plate mounted to the platform, wherein the cover plate and the first side of the platform define bounds of the platform cavity, wherein the cover plate comprises at least one impingement opening to enable airflow to enter the platform cavity, wherein the tapering portion defines a first turning inlet and a second turning inlet, wherein the first and second turning inlets are open to the platform cavity, wherein the first turning inlet faces a first direction to receive a flow of air from the platform cavity flowing in a first flow direction and second turning inlet faces a second direction, opposite the first direction, to receive a flow of air from the platform cavity flowing in a second flow direction, opposite the first flow direction, such that the platform flow turning element receives flow from two opposite directions, and wherein the platform flow turning element is configured to turn a flow of air flowing in the first flow direction and a flow of air flowing in the second flow direction along the tapering portion such that the two flows of air flow in the same flow direction within the airfoil cavity.

8. The gas turbine engine of claim 7, wherein the platform flow turning element is welded to the first side of the platform.

9. The gas turbine engine of claim 7, wherein the airfoil includes a plurality of airfoil cavities, each airfoil cavity having a respective airfoil cavity inlet, the component further comprising an additional platform flow turning element positioned on the first side of the platform and arranged relative to and within one additional airfoil cavity of the plurality of airfoil cavities.

10. The gas turbine engine of claim 7, wherein the platform flow turning element extends a first distance above the first side of the platform and the turning portion of the platform flow turning element extends a second distance from the second side of the platform and into the airfoil cavity.

11. The gas turbine engine of claim 7, wherein the platform flow turning element is made from sheet metal.

12. The gas turbine engine of claim 7, wherein the second side is exposed to a hot gaspath of the gas turbine engine.

13. The gas turbine engine of claim 7, wherein the airfoil is a vane of the gas turbine engine.

* * * * *